C. WHITE.
PISTON AND PISTON ROD CONNECTION.
APPLICATION FILED OCT. 11, 1915.

1,195,541. Patented Aug. 22, 1916.

Inventor:
Charles White,
by Spear, Middleton, Donaldson & Spear
Atty's.

UNITED STATES PATENT OFFICE.

CHARLES WHITE, OF BALTIMORE, MARYLAND.

PISTON AND PISTON-ROD CONNECTION.

.,195,541.  Specification of Letters Patent.  Patented Aug. 22, 1916.

Application filed October 11, 1915. Serial No. 55,312.

*To all whom it may concern:*

Be it known that I, CHARLES WHITE, a citizen of the United States, residing at Baltimore, Maryland, have invented certain new and useful Improvements in Pistons and Piston-Rod Connections, of which the following is a specification.

The invention consists in the features and combination and arrangement of parts hereinafter described and particularly pointed out in the claims.

Figure 1:
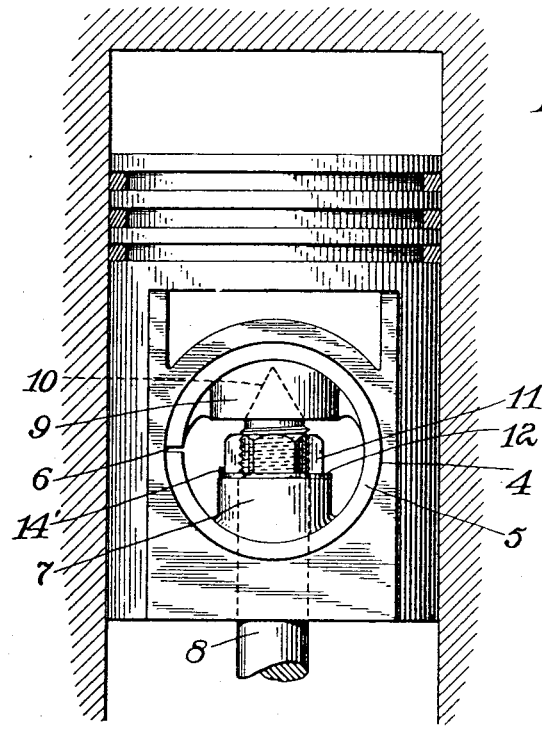
Figure 3:
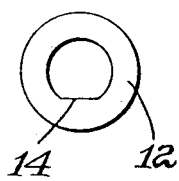
Figure 2:
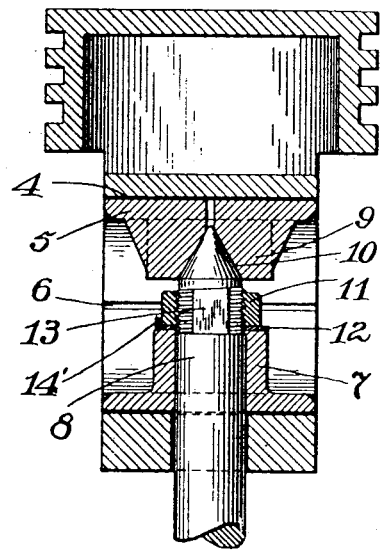

In the accompanying drawings Figure 1 is a side view of a piston with a portion of the cylinder represented diagrammatically, and with my improved wrist pin and piston rod connection in place. Fig. 2 is a sectional view of Fig. 1, viewed a quarter turn therefrom, with parts in elevation; Fig. 3 is a plan view of a lock washer.

In carrying out the invention, I provide a piston with a transverse cylindrical bore or opening 4 to receive the wrist pin 5 which is formed of cast iron or other suitable material and consists of a hollow sleeve split at one point indicated at 6, so that the said hollow wrist pin may be properly expanded to fit the bore or opening in the piston. The wrist pin has two bosses cast on its inner side, one of these, 7, being provided with an opening extending therethrough axially in line with the center of the wrist pin, and of a diameter adapted to receive the upper end 8 of the piston rod. The other boss which is cast on the interior of the wrist pin shown at 9 is provided with a conical socket 10 to receive the conical end of the piston rod. That portion of the piston rod which extends across the space between these bosses 7 and 9 is screw-threaded to receive a nut 11 which bears upon a washer 12 seated on the upper face of the boss 7. This washer, as shown in Fig. 3, has a non-circular opening to receive the threaded portion of the piston rod, and the said piston rod has a flat portion at 13 to receive the straight edge 14 of the washer, so that the washer can not turn in respect to the piston rod. When the nut is properly screwed up, the edge of the washer is bent up as at 14' to lie against one of the faces of the nut to lock the same in place. It will be seen from the construction described that access may be readily had to the adjusting nut because of the open character of the wrist pin, and the wrist pin is of such size as to afford space for the ready adjustment of the nut. By turning the nut onto the piston rod to the proper point, the wrist pin will be expanded to secure a proper seating thereof in the bore or opening of the piston, it being clear that by turning the nut the split pin may be spread because of the pressure of the nut exerted on the boss 7, and the pressure of the conical end of the piston in the boss 9. Looseness due to the wear may be readily taken up by the adjustment of this nut.

While I have described the wrist pin as being of cast metal, and in the f of a sleeve or hollow pin split at one point, the said pin may be formed in sections, one section carrying the boss 9 and the other section carrying the boss 7, and by operating the nut the sections may be spread to be properly seated in the bore of the piston. The washer may be readily bent down so that the nut may be turned, and then the washer may be turned up again to hold the nut.

By the construction described which permits ready adjustment, the parts may be manufactured without necessitating the extremely fine workmanship and fine fitting ordinarily necessary, because any small discrepancy as to dimensions can be compensated for by proper adjustment of the parts. I prefer to use cast iron as the material of the wrist pin, for as is well known this is highly efficient as a wearing material, and is inexpensive. The wrist pin, while of considerable diameter, presenting a considerable bearing surface, and much larger than the ordinary wrist pin, is light, by reason of its hollow construction.

The strains are taken between the cone and the nut which shoulders upon the boss, and there is no liability for lost motion between the piston rod and the wrist pin, because the natural tendency of the wrist pin is to spring inwardly, or in other words, for its sides to approach each other at the split portion 6. The split form of wrist pin is preferred because this, by its elasticity, provides sufficient scope to take up wear or compensate for lack of nicety in measurement in forming the parts.

One object of the cone end of the connecting rod is to provide a substantially seated bearing to stand the thrust on the combustion or expansion stroke. The threaded portion, together with the nut, takes only the stresses of the suction stroke, which is very light in all vertical engines of this character. The cone end also sustains the thrust on the compression stroke.

I claim as my invention:—

1. In combination with a piston, a wrist pin seated therein, a piston rod extending into the wrist pin and means within the wrist pin for adjustably connecting the same with the piston rod.

2. In combination with a piston, a wrist pin seated therein, a piston rod extending into the wrist pin with its end bearing upon the inner side of the wrist pin and taking the end thrust and means for holding the wrist pin and piston rod together, substantially as described.

3. In combination with a piston, an expansible wrist pin seated therein. a piston rod extending into the wrist pin with its end bearing upon the inner side of the wrist pin and taking the end thrust and means for holding the wrist pin and piston rod together and for expanding said wrist pin, substantially as described.

4. In combination a piston, an expansible wrist pin seated and turnable therein, a piston rod connected with the wrist pin and turning the same in its seat, and means for expanding the wrist pin against its seat in the piston, substantially as described.

5. In combination a piston, an expansible wrist pin seated therein, a piston rod connected with the wrist pin, and means for expanding the wrist pin against its seat in the piston, said expanding means forming a connection between the piston rod and wrist pin, substantially as described.

6. In combination with a piston, a piston rod, a hollow expansible wrist pin, the said piston rod bearing upon the wrist pin on its inner side, and a nut adjustable on the piston rod and arranged to press upon the opposite side of the wrist pin, substantially as described.

7. In combination a piston, a piston rod, a hollow wrist pin seated in the piston and adapted to be expanded, said wrist pin having a seat on its interior for the end of the piston rod, and having a boss opposite said seat to receive a nut threaded upon the piston rod, the turning of said nut serving to expand the wrist pin, substantially as described.

8. In combination with a piston having an opening extending therethrough from side to side, and open at both ends, a wrist pin of hollow form seated in said opening, a piston rod extending within the wrist pin, and means within the wrist pin connecting the same with the piston rod, substantially as described.

9. In combination a piston having an opening therethrough, a hollow wrist pin seated in said opening and adapted to be expanded, said wrist pin having two internal bosses, a piston rod passing through one boss and seated in a socket in the other boss, and a nut on a screw threaded portion of the piston rod at a point between the bosses, substantially as described.

10. In combination a piston having an opening therethrough, a wrist pin in the form of a hollow shell split at one side, a piston rod extending into the wrist pin, and means for connecting the piston rod with the wrist pin and for expanding the said wrist pin, said means being accessible through the open end of the wrist pin for adjustment, substantially as described.

In testimony whereof I affix my signature in presence of two witnesses.

CHARLES WHITE.

Witnesses:
RICHARD B. PUE,
EILEEN A. HEMSLEY.